(12) United States Patent
Kuenzie et al.

(10) Patent No.: US 10,381,184 B1
(45) Date of Patent: Aug. 13, 2019

(54) MULTIPLE-USE INTERLOCKING FUSED POWER AND GROUNDING DISTRIBUTION BLOCK

(71) Applicant: AAMP of Florida, Inc., Clearwater, FL (US)

(72) Inventors: Kevin Kuenzie, Canyon Lake, CA (US); Brian Morelli, Pasadena, CA (US); Jared Wilson, La Habra, CA (US)

(73) Assignee: AAMP of Florida, Inc., Clearwater, FL (US)

( * ) Notice: Subject to any disclaimer, the term of this patent is extended or adjusted under 35 U.S.C. 154(b) by 0 days.

(21) Appl. No.: 15/988,111

(22) Filed: May 24, 2018

(51) Int. Cl.
*H01H 85/20* (2006.01)
*H01H 85/22* (2006.01)
*B60R 16/033* (2006.01)
*B60R 16/023* (2006.01)
*B60L 3/00* (2019.01)

(52) U.S. Cl.
CPC ....... *H01H 85/203* (2013.01); *B60R 16/0238* (2013.01); *B60R 16/033* (2013.01); *H01H 85/2005* (2013.01); *H01H 85/2045* (2013.01); *B60L 3/0069* (2013.01); *H01H 85/205* (2013.01)

(58) Field of Classification Search
CPC ............. H01H 85/203; H01H 85/2005; H01H 85/2045; H01H 85/205; B60R 16/0238; B60R 16/033; B60L 3/0069
USPC ........................................................ 337/142
See application file for complete search history.

(56) References Cited

U.S. PATENT DOCUMENTS

| | | | | |
|---|---|---|---|---|
| 2,091,204 A | * | 8/1937 | Horn ..................... | H01H 85/202 337/188 |
| 3,202,788 A | * | 8/1965 | George .................. | H01H 9/102 337/194 |
| 3,742,413 A | * | 6/1973 | Taylor .................. | H01H 85/202 337/201 |
| 4,767,339 A | * | 8/1988 | Comerci .............. | H01H 85/202 439/716 |
| 5,841,337 A | * | 11/1998 | Douglass ........... | H01H 85/0452 337/198 |
| 6,054,915 A | * | 4/2000 | Rowton ............. | H01H 85/2045 337/180 |
| 6,157,287 A | * | 12/2000 | Douglass ............. | H01H 85/203 337/159 |
| 6,326,878 B1 | * | 12/2001 | Liang ................... | H01H 85/202 337/214 |
| 6,396,380 B1 | * | 5/2002 | Girke ................... | H01H 85/044 337/188 |
| D461,781 S | * | 8/2002 | Fukumori .......... | H01H 85/2035 D13/161 |

(Continued)

*Primary Examiner* — Anatoly Vortman
(74) *Attorney, Agent, or Firm* — Weiss & Arons LLP (57) ABSTRACT

Apparatus for enabling distribution of electric power, fusing, and/or ground connection in electrical systems is provided. The apparatus may include an extensible, interlocking, modular block of multiple-use modules. Each module may be configured to include a fuse or a link bar mounted within it. Each module may accept multiple sizes and types of fuses. Each module may be configured to include an external link bar for providing an electrical connection to at least one other module. Apparatus may enable distribution of electrical power, fused power, and/or ground connection from a power source to a plurality of electrical components while organizing and minimizing wired connections.

17 Claims, 6 Drawing Sheets

(56) References Cited

U.S. PATENT DOCUMENTS

| | | | | |
|---|---|---|---|---|
| 6,784,783 B2* | 8/2004 | Scoggin | ............... | H01H 85/547 |
| | | | | 337/194 |
| 6,853,289 B2* | 2/2005 | Scoggin | ............... | H01H 85/547 |
| | | | | 337/194 |
| 6,878,004 B2* | 4/2005 | Oh | ..................... | H01H 85/2035 |
| | | | | 439/250 |
| 10,040,412 B2* | 8/2018 | Leverett, Jr. | ......... | H05K 5/0043 |
| 2017/0345604 A1* | 11/2017 | Shah | ................. | H01H 85/0411 |

* cited by examiner

MULTIPLE-USE INTERLOCKING FUSED POWER AND GROUNDING DISTRIBUTION BLOCK

FIELD OF TECHNOLOGY

Aspects of the disclosure relate to apparatus for distributing electric current. Specifically, aspects of the disclosure relate to apparatus for enabling distribution of electric power, fusing, and/or ground connection in electrical systems.

BACKGROUND OF THE DISCLOSURE

Vehicles, such as automobiles, typically include a plurality of electrical components. The electrical components may contribute to the primary operation of the vehicle. The electrical components may provide functionality peripheral to the primary operation of the vehicle. Examples of electrical components in vehicles include engine starters, lighting systems, steering systems, heating and cooling systems, motors for moving wipers and windows, and information, entertainment, and infotainment systems. Information, entertainment, and infotainment systems may include radios, amplifiers, speakers, video screens, global positioning systems (GPS), and combinations thereof.

Electrical power in a vehicle is typically provided by a power source such as a battery and/or an alternator. The alternator may include a voltage regulator. An electrical system in a vehicle may include one or more electrical components connected to the power source via a network of wires. Each electrical component may have a wired connection to a positive terminal of the power source for power input. Each electrical component may also have a wired connection to a negative terminal of the power source to complete an electric circuit and for electrical grounding. The connection to the negative terminal of the power source may include an electrically conductive vehicle frame or chassis.

A fuse typically forms a part of the wired connection between an electrical component and the power source in a vehicle. A fuse is an overcurrent protection device (OCPD). The fuse is designed to break an electric circuit by melting or otherwise opening when the fuse conducts an unsafe level of excess electric current. Possible causes for excess current include a short circuit, an excessive load on the circuit, incorrect circuit design, a ground fault, and an arc fault. By breaking the circuit under these circumstances, a fuse acts as a "sacrificial device" to protect the components and the wiring of the electrical system. Breaking the circuit may also protect items in close proximity to the electrical system from fire hazard.

Electrical systems in vehicles such as automobiles, motorcycles, marine vessels, trucks, and industrial vehicles may be subjected to harsh environmental and/or operational conditions. The harsh conditions may include extremes of temperature, jarring vibration, and high levels of movement and acceleration. It would therefore be desirable to provide a protective module for elements, such as fuses, within the electrical systems.

Moreover, a large variety of fuses support the many different types of electrical components found in vehicles. Each electrical component may require a fuse with unique characteristics. The unique characteristics required may depend upon the specific application, voltage demand, and current demand of the component. Different fuses may vary in size, shape, and configuration. As such, it would be further desirable to provide a protective module that supports a variety of sizes, shapes, and configurations of fuses.

Furthermore, the plurality of electrical components and systems within a given vehicle may lead to a highly complex network of wires throughout the vehicle. The complexity of the wiring may increase the difficulty of installing components, as well as diagnosing, accessing, and repairing issues in the electrical system. It would therefore be further desirable to provide a modular, extensible, and customizable block of protective modules that enables distribution of fused power and/or ground connection to a plurality of electrical components. It would be desirable for the block to be situated in a single location while minimizing and organizing the wired connections between the power source and the various electrical components.

SUMMARY OF THE DISCLOSURE

A modular distribution block is provided. The distribution block may be for mounting in a vehicle to provide fusing, power distribution, and/or ground distribution to electrical components in the vehicle. The distribution block may include two or more modules. Each module may include a base defining a longitudinal axis. The base may include two opposing ends and two opposing sides. The two ends may be disposed along the longitudinal axis, and the two sides may be disposed orthogonally to the longitudinal axis.

The base of a module may include a tongued protrusion along at least a portion of a length of one side, and a grooved protrusion along at least a portion of a length of the other side. The tongued protrusion may be configured to interlock with the grooved protrusion of an adjacent module that is proximal to the one side. Similarly, the grooved protrusion may be configured to interlock with the tongued protrusion of an adjacent module that is proximal to the other side. Each module may thereby interlock with an adjacent module on either one or both of its sides.

The base may also include a plurality of holes formed therein. The holes may be configured to enable the base to be mounted, using screws, to a vehicle.

Each module may include a first and a second electrically conductive block connector. The first block connector may be mounted upon the base at a first one of the opposing ends. The second block connector may be mounted upon the base at a second one of the opposing ends. Each block connector may be configured to be coupled to either a source of electrical power, a ground connection, or an electrical load.

Each block connector may be further configured to be coupled to an end of either a fuse or a link bar. A fuse or link bar may extend across the base from one block connector to the other block connector by coupling a first end of the fuse or link bar to one block connector and another end of the fuse or link bar to the other block connector. A link bar may include a length of electrically conductive material for the conduction and/or distribution of electric current. A fuse may include a length of electrically conductive material that is designed to break an electric circuit of which it is part when the current therein exceeds a predetermined safe level.

Each module may include a cover. The cover may be configured to connect to the base. The cover may be configured to cover, at least partially, the first and second block connectors.

Each module may include at least one external link bar. The external link bar may enable an electrical connection between a block connector of a module and a block connector of an adjacent module. The electrical connection may be formed by coupling one end of the external link bar to a block connector of the module and another end of the external link bar to a block connector of the adjacent module. The electrical connection may enable the distribution of electric current between the module and the adjacent module over the external link bar.

The two or more modules of the distribution block may be configured to join together to form a contiguous row of interlocked modules. The contiguous row may be formed when each module adjoins an adjacent module on one or both sides. A module may adjoin an adjacent module by interlocking the tongued protrusion of one with the grooved protrusion of the other. The contiguous row of two or more interlocked modules may form a block of interlocked modules. Furthermore, each module may be configured to mount to a vehicle, so that the contiguous row of adjacent interlocked modules may be mounted as one block in one location in the vehicle.

Each module may be configured to include either a link bar or a fuse that is mounted therein. The link bar or fuse may be mounted to extend from one block connector of the module to the other block connector of the module. Each module may also be configured to electrically connect to one or more adjacent modules via an external link bar to distribute electric power and/or ground connection between the modules.

Each module may be configured to connect, via one block connector, to an electrical load, and, via the other block connector, to either a source of electrical power or a ground connection. The electrical load may be an electrical component of the vehicle. The source of electrical power and ground connection may be a positive and a negative terminal of a vehicle battery respectively. The distribution block may thereby provide a customizable, extensible, apparatus in a single location for distributing power, fused power, and/or ground connection from the vehicle battery to a plurality of electrical components of the vehicle.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

A modular distribution block is provided. The distribution block may be for mounting in a vehicle to provide fusing, power distribution, and/or ground distribution to electrical components in the vehicle. The distribution block may include two or more modules. A module may alternatively be referred to herein as a platform. In certain embodiments, the distribution block may contain a single module. Each module may include a base defining a longitudinal axis. The base may include two opposing ends and two opposing sides. The two ends may be disposed along the longitudinal axis, and the two sides may be disposed orthogonally to the longitudinal axis. The base may be rectangular in shape.

The base of a module may include a tongued protrusion along at least a portion of a length of one side, and a grooved protrusion along at least a portion of a length of the other side. The tongued protrusion may be configured to interlock with the grooved protrusion of an adjacent module that is proximal to the one side in which the tongued protrusion is located. Similarly, the grooved protrusion may be configured to interlock with the tongued protrusion of an adjacent module that is proximal to the other side. Each module may thereby interlock with an adjacent module on either one or both of its sides. The interlocking may include a "tongue-in-groove" joint. The interlocking may be preferred to include any appropriate mechanism for joining one or more modules.

In certain embodiments, the base may also include a plurality of holes formed therein. The holes may be configured to enable the base to be mounted to a vehicle using screws. The holes may also enable the base to be mounted on any suitable surface. In other embodiments, the base may include any other suitable mounting mechanism for mounting the base on a surface.

Each module may include a first and a second electrically conductive block connector. The first block connector may be mounted upon the base at a first one of the opposing ends. The second block connector may be mounted upon the base at a second one of the opposing ends. Each block connector may be configured to be coupled to either a source of electrical power, a ground connection, or an electrical load.

Each block connector may be configured to be coupled to an end of either a fuse or a link bar. The fuse or link bar may thereby extend across the base from one block connector to the other block connector by coupling a first end of the fuse or link bar to one block connector and another end of the fuse or link bar to the other block connector. A link bar may include a length of electrically conductive material for the conduction and/or distribution of electric current. A fuse may include a length of electrically conductive material that is designed to break an electric circuit of which it is part when the current therein exceeds a predetermined safe level.

Each module may include a cover. The cover may be configured to connect to the base. The cover may connect to the base via a mechanism whereby the cover "snaps" into the base. The cover may connect to the base via one or more screws. The cover may be configured to cover, at least partially, the first and second block connectors.

Each module may include at least one external link bar. The external link bar may enable an electrical connection between a block connector of a module and a block connector of an adjacent module. The electrical connection may be formed by coupling one end of the external link bar to a block connector of the module and another end of the external link bar to a block connector of the adjacent module. An end of an external link bar may be coupled to a block connector via a mounting component of the block connector. The electrical connection may enable the distribution of electric current between the module and the adjacent module over the external link bar.

Two or more modules of the distribution block may be configured to join together to form a contiguous row of interlocked modules. The contiguous row may be formed when each module adjoins with an adjacent module on one or both sides. A module may adjoin with an adjacent module by interlocking the tongued protrusion of one with the grooved protrusion of the other. The contiguous row of two or more interlocked modules may form a block of interlocked modules. Furthermore, each module may be configured to mount to a vehicle, so that the contiguous row of adjacent interlocked modules may be mounted as one block in one location in the vehicle.

Each module may be configured to connect via one block connector to an electrical load. The other block connector may connect to either a source of electrical power or a ground connection. The electrical load may be an electrical component of the vehicle. The source of electrical power and ground connection may be a positive and a negative terminal of a vehicle battery respectively. The source of electrical power may also be an alternator.

Each module may be configured to include either a link bar or a fuse that is mounted therein. The link bar or fuse may be mounted to extend from one block connector of the module to the other block connector of the module. It may be preferred to mount a link bar in a module when the module is included in a circuit on the output side of an electrical load. It may be preferred to mount a fuse in a module when the module is included in a circuit on the input side of an electrical load.

Each module may also be configured to electrically connect to one or more adjacent modules via an external link bar to distribute electric power and/or ground connection between the modules. An external link bar may enable a single wired connection between a power source and a plurality of modules. The plurality of modules may then distribute fused power to the input of a plurality of electrical components. An external link bar may also enable a single wired connection between a plurality of modules and a ground connection. The output of a plurality of electrical components may be connected to the plurality of modules for a connection to ground.

The distribution block may thereby provide a customizable, extensible, apparatus, in a single location, for distributing power, fused power, and/or ground connection from the vehicle battery to a plurality of electrical components of the vehicle.

In the distribution block, each block connector may include an electrical terminal. The electrical terminal may enable the block connector to be coupled to either a source of electrical power, a ground connection, or an electrical load. The electrical terminal may include a cavity. The cavity may enable the coupling of a wire by accepting the wire therein. The wire may be secured in the cavity by way of a set screw. In some embodiments, the electrical terminal may include any suitable feature for securing a wire.

Each module in the distribution block may further include that each block connector includes at least a first and a second mounting component. The mounting component may be configured to be coupled to either a link bar or a fuse. The first mounting component may include a threaded cavity on a top surface of the block connector. The second mounting component may include a threaded cavity in an element protruding from the side of the block connector in the direction of the other block connector. Each threaded cavity may enable the mounting of an end of a link bar or fuse thereon with a screw. The module may thereby enable the mounting of one size of link bar or fuse across the base via the first mounting components, and a second size of link bar or fuse across the base via the second mounting components. Each block connector may be preferred to include more than two mounting components.

In some embodiments, the mounting components may be suitable for attaching bolt-on fuses. In other embodiments, the mounting components may be suitable for attaching blade-type fuses. In yet other embodiments, the mounting components may be suitable for attaching other appropriate fuses. In some embodiments, each block connector may include one or more mounting components suitable for one fuse type, and one or more mounting components suitable for another fuse type.

In certain embodiments, the cover of each module of the distribution block may be configured to be removable while the base is mounted to a vehicle. The cover may be removable even when the module is mounted to a vehicle and interlocked with one or more adjacent modules. This may enable access to the inner components of the module without dismounting the module from the vehicle.

A modular distribution block is provided. The distribution block may include two or more modules. Each module may include a base defining a longitudinal axis. The base may include two opposing ends and two opposing sides. The two ends may be disposed along the longitudinal axis, and the two sides may be disposed orthogonally to the longitudinal axis.

The base of a module may further include a tongued protrusion, or any other suitably shaped mating component, along at least a portion of a length of one side. The base of a module may also include a grooved protrusion, or any other suitably shaped component designed to securely join with a mating component, along at least a portion of a length of the other side. The tongued protrusion may be configured to interlock with the grooved protrusion of an adjacent module that is proximal to the one side. Similarly, the grooved protrusion may be configured to interlock with the tongued protrusion of an adjacent module that is proximal to the other side. Each module may thereby be able to interlock with an adjacent module on either one or both of its sides.

Each module in the distribution block may include a first and a second electrically conductive block connector. Each block connector may include an electrical terminal and at least one mounting component. The electrical terminal may be configured to be coupled to either a source of electrical power, a ground connection, or an electrical load. The mounting component may be configured to be coupled to a link bar and/or a fuse. A link bar may include a length of electrically conductive material for the distribution of electric current. Distribution of electric current may include conducting electric current to one or more components. A fuse may include a length of electrically conductive material that is designed to break an electric circuit of which it is part when the current therein exceeds a predetermined safe level.

The first block connector in a module may be mounted upon the base at a first one of the opposing ends. The second block connector in the module may be mounted upon the base at a second one of the opposing ends. A first end of a fuse or link bar may be coupled to a mounting component of the first block connector. A second end of the fuse or link bar may be coupled to a mounting component of the second block connector. The fuse or link bar may thereby extend from one block connector to the other block connector. The extending of the fuse or link bar from one block connector to the other block connector may enable the distribution of electric current across the module from one block connector to the other block connector over the fuse or link bar.

Each module may also include a cover. The cover may connect to the base. The cover may enclose, at least partially, the first and second block connectors.

The distribution block may include at least one external link bar. The external link bar may enable an electrical connection between a block connector of a module and a block connector of an adjacent module. The electrical connection may be created by coupling one end of the external link bar to a block connector of the module and another end of the external link bar to a block connector of the adjacent module. The electrical connection may enable the distribution of electric current between the module and the adjacent module over the external link bar.

Two or more modules in the distribution block may be configured to interlock adjacently to form a block. A module may interlock with an adjacent module by interlocking the tongued protrusion of one with the grooved protrusion of the other. Each module may be configured to include either a link bar or a fuse that is mounted therein. The link bar or fuse may be mounted to extend from one block connector of the module to the other block connector of the module.

Each module in the distribution block may be configured to electrically connect to one or more adjacent modules via an external link bar. The electrical connection between one or more adjacent modules via external link bar may distribute electric power and/or ground connection between the modules.

Each module in the distribution block may be configured to connect via one block connector to an electrical load. Each module in the distribution block may be configured to connect via the other block connector to either a source of electrical power or a ground connection. The connection, or coupling, of the other block connector to either a source of electrical power or a ground connection may be directly, e.g. via a wire, or indirectly, e.g. via an external link bar. The distribution block may thereby provide a customizable, extensible, system for fusing, power distribution, and/or ground distribution.

In certain embodiments, each module of the distribution block may further include that each block connector includes at least a first and a second mounting component. The first mounting component may include a threaded cavity on a top surface of the block connector. The second mounting component may include a threaded cavity in an element protruding from the side of the block connector in the direction of the other block connector. Each threaded cavity may enable the mounting of an end of a link bar and/or of a fuse thereon with a screw. The module may thereby enable the mounting of one size of link bar or fuse across the base via the first mounting components, and a second size of link bar or fuse across the base via the second mounting components.

A multiple-use platform for fusing, power distribution, and/or ground distribution is provided. A platform may alternatively be referred to as a module. The platform may include a base defining a longitudinal axis. The base may include two opposing ends and two opposing sides. The two ends may be disposed along the longitudinal axis, and the two sides may be disposed orthogonally to the longitudinal axis.

The platform may include a first and a second electrically conductive block connector. Each block connector may include an electrical terminal and at least one mounting component. The electrical terminal may be configured to be coupled to either a source of electrical power, a ground connection, or an electrical load. The mounting component may be configured to be coupled to either a link bar or a fuse. The link bar may include a length of electrically conductive material for the distribution of electric current. The fuse may include a length of electrically conductive material that is designed to break an electric circuit of which it is part when the current therein exceeds a predetermined safe level. The platform may also include a cover. The cover may connect to the base and cover, at least partially, the first and second block connectors.

The first block connector of the platform may be mounted upon the base at a first one of the opposing ends. The second block connector of the platform may be mounted upon the base at a second one of the opposing ends. A first end of a fuse or link bar may be coupled to a mounting component of the first block connector. A second end of the fuse or link bar may be coupled to a mounting component of the other block connector. The fuse or link bar may thereby extend from one block connector to the other block connector. The extending may enable the distribution of either fused power, power, or ground connection across the platform from one block connector to the other block connector over the fuse or link bar.

In certain embodiments of the platform, the electrical terminal of one of the block connectors may be configured to be coupled to a wire that is connected to either a source of electrical power or ground. The electrical terminal of the other block connector may be configured to be coupled to a wire that is connected to an electrical load.

In certain embodiments of the platform, each electrical terminal of a block connector may include a cavity. The cavity may enable the coupling of a wire to the block connector by accepting the wire therein. The wire may be secured in the cavity by way of a set screw.

In certain embodiments, the platform may further include a plurality of adaptive inserts for the cavities. The inserts may enable the electrical terminals to accept wires of any suitable range of thickness. An example of a suitable range may be may be from 1/0-gauge to 8-gauge.

In certain embodiments of the platform, the base may include a tongued protrusion along at least a portion of a length of one side, and a grooved protrusion along at least a portion of a length of the other side. The tongued protrusion may be configured to interlock with the grooved protrusion of an adjacent platform that is proximal to the one side. Similarly, the grooved protrusion may be configured to interlock with the tongued protrusion of an adjacent platform that is proximal to the other side. A platform may thereby be able to interlock with an adjacent platform on either one or both of its sides.

In certain embodiments, the platform may include at least one external link bar. The external link bar may enable an electrical connection between a block connector of the platform and a block connector of an adjacent platform. The electrical connection may include coupling one end of the external link bar to a block connector of the platform and another end of the external link bar to a block connector of the adjacent platform.

In certain embodiments of the platform, the cover may include one or more apertures formed therein. The apertures may allow for an external link bar to extend from the platform to the adjacent platform.

In certain embodiments, a first end of the external link bar may be coupled to a first block connector of the platform. The electrical terminal of the first block connector may be coupled to a power source. A second end of the external link bar may be coupled to a first block connector of an adjacent platform. Electrical power may thereby be distributed to both the platform and the adjacent platform.

The platform may further include a fuse extending from the first block connector to the second block connector. The electrical terminal of the second block connector of the platform may be connected to an electrical load. The adjacent platform may also include a fuse extending from the first block connector to the second block connector. The electrical terminal of the second block connector of the adjacent platform may be connected to another electrical load. This configuration may enable distribution of fused power to the loads of both the platform and the adjacent platform.

In certain embodiments, a first end of the external link bar may be coupled to a first block connector of the platform. The electrical terminal of the first block connector may be coupled to a ground connection. A second end of the external link bar may be coupled to a first block connector of an adjacent platform. A ground connection may thereby be distributed to both the platform and the adjacent platform.

The platform may further include a link bar extending from the first block connector to the second block connector. The electrical terminal of the second block connector of the platform may be connected to an electrical load. The adjacent platform may also include a link bar extending from the first block connector to the second block connector. The electrical terminal of the second block connector of the adjacent platform may be connected to another electrical load. This configuration may enable distribution of a ground connection to the loads of both the platform and the adjacent platform.

In certain embodiments of the platform, each block connector may include a plurality of mounting components. The mounting components may be configured to enable the mounting of fuses of multiple types and sizes across the platform. The platform may be configured to accept MIDI, AFS, ANL, and MANL fuses. The platform may be configured to accept any other desired fuse, such as bolt-on (AMG, AMI), blade type fuses (such as ATM, ATC, and Maxi) and/or marine rated battery fuses (MRBF).

In certain embodiments, each block connector may include at least a first and a second mounting component. The first mounting component may include a threaded cavity on a top surface of the block connector. The second mounting component may include a threaded cavity in an element protruding from the side of the block connector in the direction of the other block connector. Each threaded cavity may enable the mounting of an end of a link bar or fuse thereon with a screw. The platform may thereby enable the mounting of one size of link bar or fuse across the platform via the first mounting components, and a second size of link bar or fuse across the platform via the second mounting components.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is understood that other embodiments may be utilized, and that structural, functional, and procedural modifications may be made without departing from the scope and spirit of the present disclosure.

Figure 1:
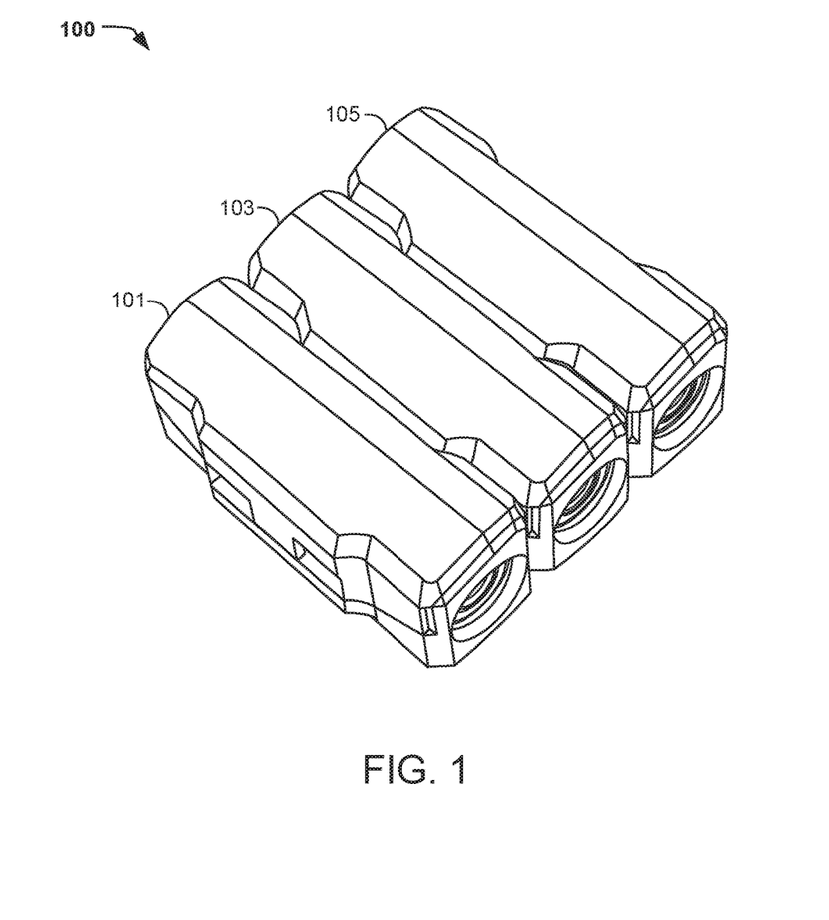
FIG. 1 shows an illustrative system in accordance with principles of the disclosure.

FIG. 1 shows illustrative system 100. System 100 may be an interlocked distribution block. System 100 may include three modules, 101, 103, and 105. Modules 101, 103, and 105 may be platforms. System 100 may be a plurality of interlocked platforms.

Module 101 is shown adjacent to the left side of module 103, and module 105 is shown adjacent to the right side of module 103. The grooved protrusion of each module may be on the left side of the base of the module, and the tongued protrusion of each module may be on the right side of the base of the module. The grooved protrusion of module 103 may be interlocked with the tongued protrusion of module 101. The tongued protrusion of module 103 may be interlocked with the grooved protrusion of module 105.

In certain embodiments, the grooved protrusion of each module may be on the right side of the base of the module, and the tongued protrusion of each module may be on the left side of the base of the module. In these embodiments, the grooved protrusion of module 103 may be interlocked with the tongued protrusion of module 105, and the tongued protrusion of module 103 may be interlocked with the grooved protrusion of module 101.

Figure 2:
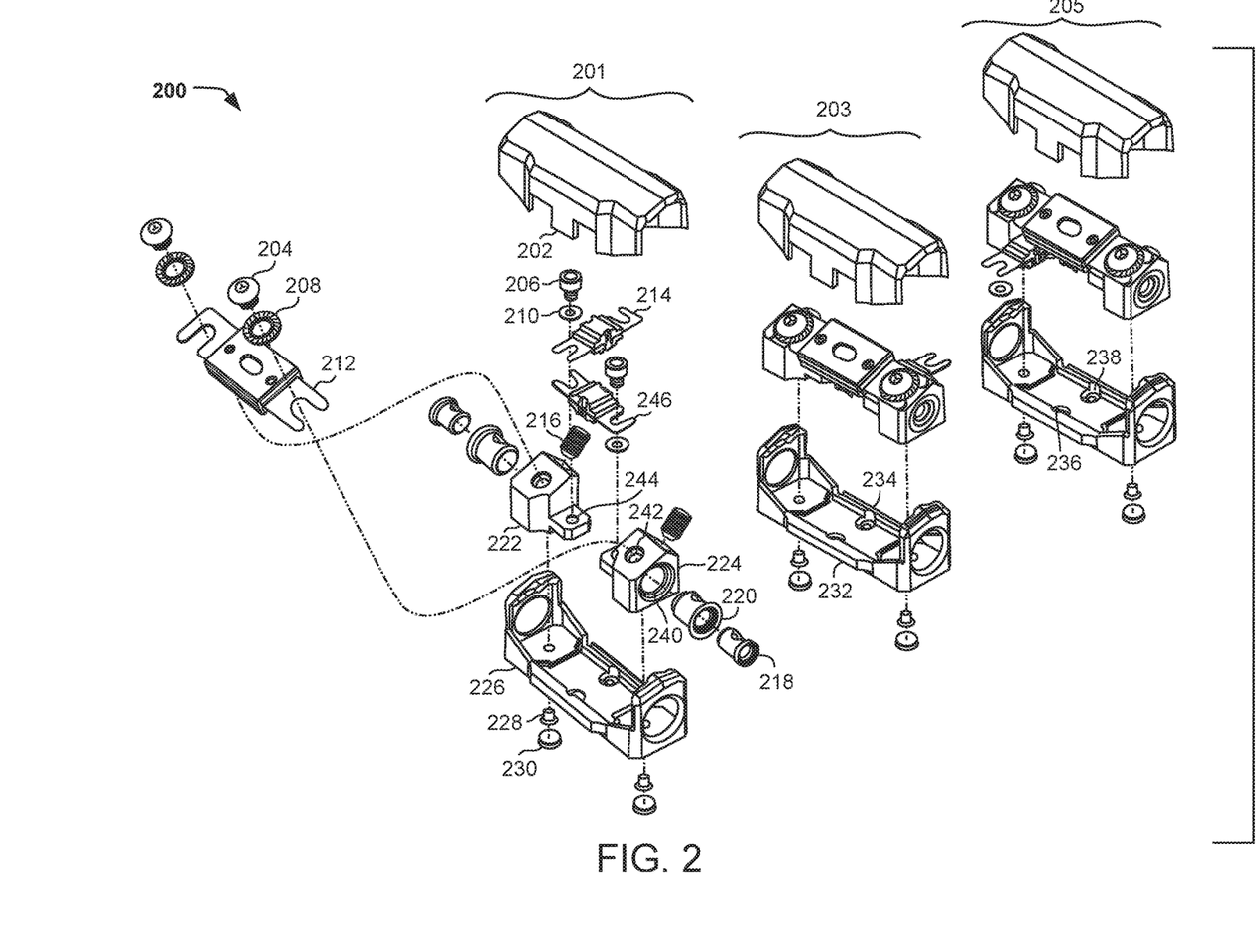
FIG. 2 shows another illustrative system in accordance with principles of the disclosure.

FIG. 2 shows illustrative system 200. System 200 may be an exploded perspective of a system similar to system 100 shown in FIG. 1. Module 201 is shown to the left of module 203, and module 205 is shown to the right of module 203.

Component 226 may be the base of module 201. Component 202 may be the cover of the module. Cover 202 and base 226 may be designed so that cover 202 connects to base 226 with a secure fit. The design may include appropriate slots, tabs, protrusions, and/or grooves formed on cover 202 and base 226.

Grooved protrusion 232 is shown on the left side of the base of module 203. Tongued protrusion 234 is shown on the right side of the base of module 203. In another embodiment, grooved protrusion 232 may be on the right side of the base of module 203, and tongued protrusion 234 may be on the left side of the base of module 203.

Holes 236 and 238 are shown in the base of module 205. Holes 236 and 238 may be used to attach module 205 to an external surface. The external surface may be a portion of a vehicle.

Component 222 may be a first block connector and component 224 may be a second block connector. Block connector 222 may be mounted on a first end of base 226. Screw 228 may be threaded through a hole in base 226 and screwed into block connector 222 to mount block connector 222 onto base 226. Screw 228 may be a low-profile socket cap screw. Screw head cap 230 may be attached to screw 228.

Block connector 224 may be mounted on a second end of base 226. The way of mounting block connector 224 may be similar to the way of mounting block connector 222. In certain embodiments, block connectors 222 and 226 may be attached to base 226 with any other appropriate way of attachment.

Block connectors 222 and 224 may each include an electrical terminal 240. Electrical terminal 240 may include a cavity. The cavity may be a socket configured to accept a wire. The accepted wire may be secured in the block connector by way of a set screw 216. The wire may be connected to a power source. The wire may be connected to a ground connection. The wire may be a ferrule terminated wire.

Electric terminal 240 may include a plurality of adaptive inserts. System 200 shows a small adaptive insert 218 and a large adaptive insert 220. Adaptive inserts 218 and 220 may decrease the diameter of electrical terminals, such as electric terminal 240. Decreasing the diameter of an electric terminal may enable the electric terminal to securely accept a size of wire smaller than would securely fit without the adaptive inserts. For example, electrical terminal 240 may accept a 1/0-gauge wire securely. Including adaptive insert 220 may enable the electrical terminal to securely accept 4-gauge wire. Further including adaptive insert 218 may enable the electrical terminal to securely accept 8-gauge wire.

In certain embodiments, adaptive insert 218 fits into adaptive insert 220, which fits into electrical terminal 240. In other embodiments, adaptive insert 218 fits directly into electrical terminal 240. In some embodiments, more than two adaptive inserts may be included.

Block connectors 222 and 224 may each include a plurality of mounting components. Component 242 may be a first mounting component, and component 244 may be a second mounting component. Mounting component 242 may include a threaded cavity on a top surface of a block connector. Mounting component 244 may include a threaded cavity on an element of a block connector that protrudes towards the other block connector.

Fuse 212 may be a large fuse. Fuse 212 may be mounted in module 201. One end of fuse 212 may be attached to block connector 224 via screw 204. Screw 204 may be a button-head socket cap screw that screws through flat washer 208 and into the first mounting component 242 of block connector 224. The other side of fuse 212 may be similarly attached via a screw to the first mounting component of block connector 222. Fuse 212 may thereby extend from one block connector to the other.

Alternatively, a small fuse 246 may be mounted in module 201. One end of fuse 246 may be attached to block connector 222 via screw 206. Screw 206 may be a socket head cap screw that screws through flat washer 210 and into the second mounting component 244 of block connector 222. The other side of fuse 246 may be similarly attached via a screw to the second mounting component of block connector 224. Fuse 246 may thereby extend from one block connector to the other.

A link bar may be a component that conducts electric current without fusing functionality. In some embodiments, a link bar may be mounted in a module similarly to fuse 246 or fuse 212 shown in system 200.

External link bar 214 may electrically connect a block connector of one module and a block connector of another module. In system 200, external link bar 214 may be attached to the second mounting component 244 of block connector 222 via screw 206. Another end of external link bar 214 may be attached to a mounting component of a block connector in module 203. In other embodiments, one end of external link bar 214 may be attached any mounting component of a block connector of one module, and another end of external link bar 214 may be attached any mounting component of a block connector of another module. In some embodiments, additional external link bars may similarly electrically connect any two modules in system 200.

Figure 3:
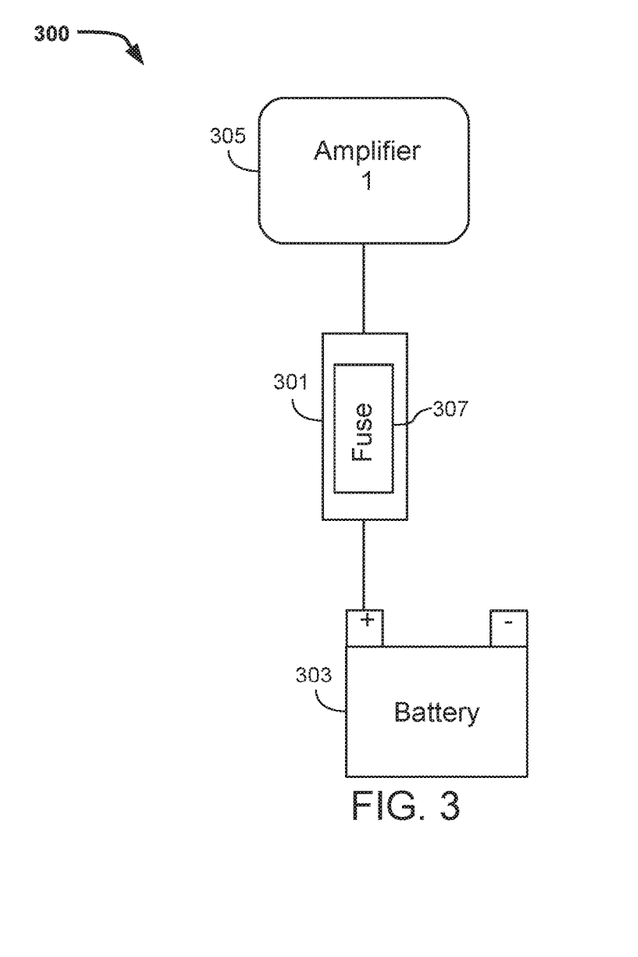
FIG. 3 shows yet another illustrative system in accordance with principles of the disclosure.

FIG. 3 shows illustrative system 300. System 300 may be an electrical system in a vehicle. System 300 may include a module 301. Module 301 may include a fuse 307. Fuse 307 may extend from one block connector to another block connector in module 301. Module 301 may be connected to a power source 303. Power source 303 may be the positive terminal of a battery. Module 301 may be connected to power source 303 via a wire that extends from the power source and is attached to a first block connector in module 301. Module 301 may also be connected to an electrical load 305. Electrical load 305 may be an amplifier. Module 301 may be connected to electrical load 305 via a wire that extends from the electrical load and is attached to a second block connector in module 301. Module 301 may thereby provide fused power to electrical load 305.

Figure 4:
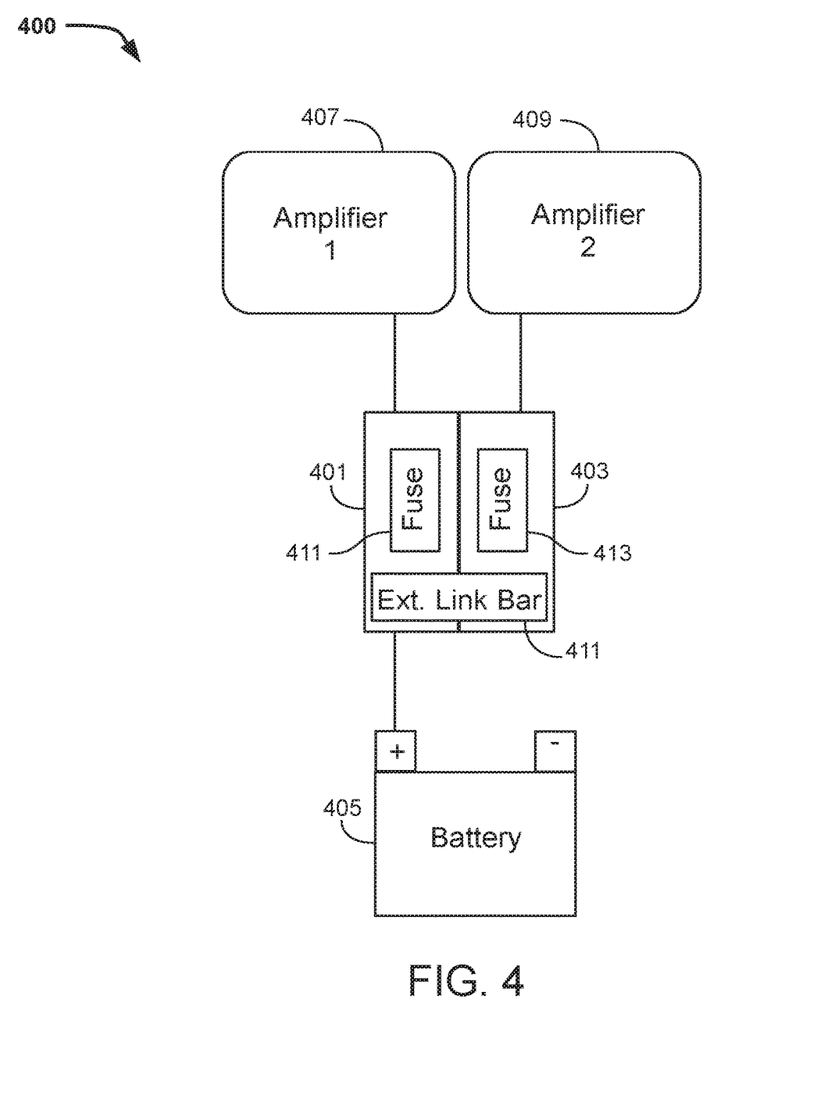
FIG. 4 shows still another illustrative system in accordance with principles of the disclosure.

FIG. 4 shows illustrative system 400. System 400 may be an electrical system in a vehicle. System 400 may include modules 401 and 403. Modules 401 and 403 may be interlocked. Modules 401 and 403 may be a distribution block. Module 401 may include fuse 411, and module 403 may include fuse 413. External link bar 411 may electrically connect a first block connector of module 401 and a first block connector of module 403.

Module 401 may be connected, via a second block connector, to an electrical load 407. Electrical load 407 may be an amplifier. Module 403 may be connected, via a second block connector, to an electrical load 409. Electrical load 409 may also be an amplifier.

Module 401 may be connected to a power source 405. Power source 405 may be the positive terminal of a battery. Electric current may flow from power source 405, through module 401 (via fuse 411), to electrical load 407. Module 401 may thereby provide fused power to electrical load 407. Electric current may also flow from power source 405, through external link bar 411, through module 403 (via fuse 413), to electrical load 409. Module 403 may thereby provide fused power to electrical load 409. Modules 401 and 403, with external link bar 411, may thereby be a distribution block that provides distribution of fused power to a plurality of electrical loads. The distribution block may do so with only a single connection to a power source.

Figure 5:
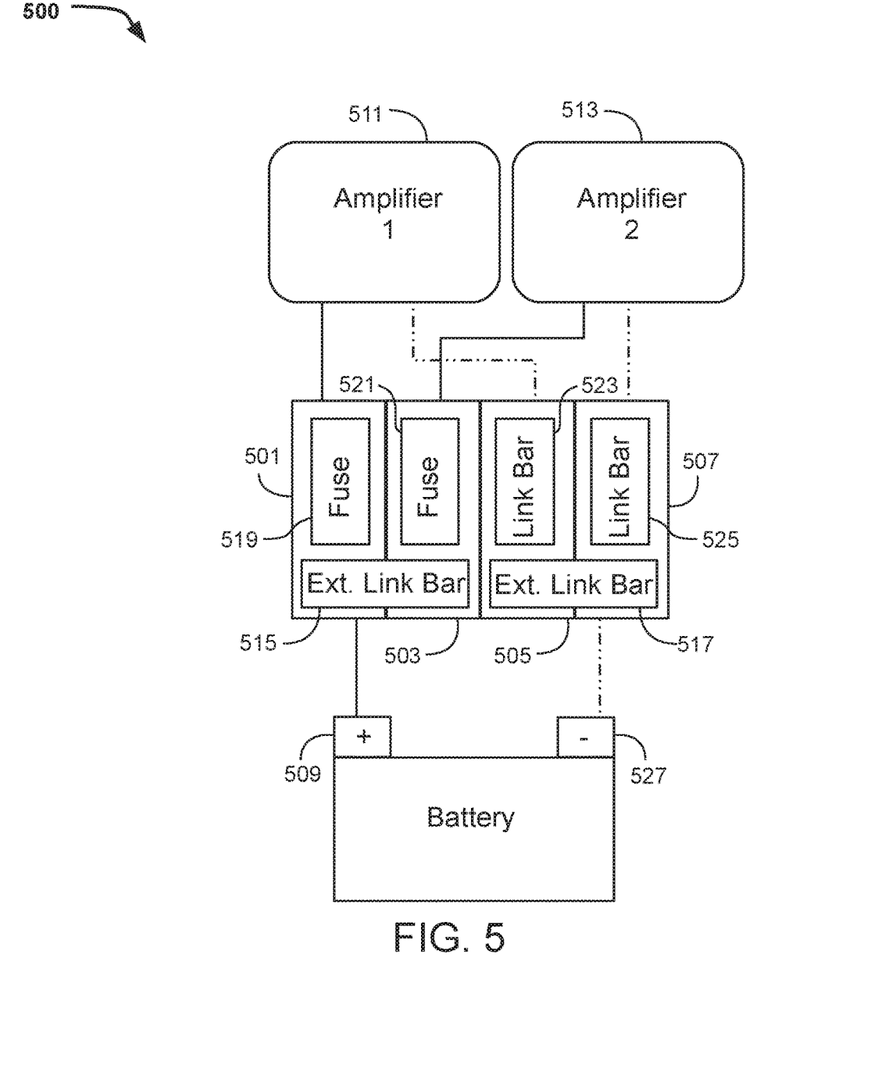
FIG. 5 shows another illustrative system in accordance with principles of the disclosure.

FIG. 5 shows illustrative system 500. System 500 may be an electrical system in a vehicle. System 500 may include modules 501, 503, 505, and 507. All or some of modules 501, 503, 505, and 507 may be interlocked. Modules 501, 503, 505, and 507 may be a distribution block. Module 501 may include fuse 419, and module 503 may include fuse 521. External link bar 515 may electrically connect a first block connector of module 501 and a first block connector of module 503. Module 505 may include link bar 523, and module 507 may include link bar 525. External link bar 517 may electrically connect a first block connector of module 505 and a first block connector of module 507.

Module 501 may be connected, via a second block connector, to the input of an electrical load 511. Electrical load 511 may be an amplifier. Module 503 may be connected, via a second block connector, to the input of an electrical load 513. Electrical load 513 may also be an amplifier. Module 505 may be connected, via a second block connector, to the output of electrical load 511. Module 507 may be connected, via a second block connector, to the output of electrical load 513.

Module 501 may be connected to a power source 509. Power source 509 may be the positive terminal of a battery. Electric current may flow from power source 509, through module 501 (via fuse 519), to electrical load 511. Module 501 may thereby provide fused power to electrical load 511. Electric current may also flow from power source 509, through external link bar 515, through module 503 (via fuse 521), to electrical load 513. Module 503 may thereby provide fused power to electrical load 513.

Module 507 may be connected to a ground connection 527. Ground connection 527 may be the negative terminal of a battery. Module 507 may be connected directly to ground connection 527 via wires, or indirectly via the vehicle chassis. In the output side of the circuit, electric current may flow from the output of electrical load 513, through module 507 (via link bar 525), to ground connection 527. Module 507 may thereby provide ground connection to electrical load 513. Electric current may also flow from the output of electrical load 511, through module 505 (via link bar 523), through external link bar 517, to ground connection 527. Module 505 may thereby provide ground connection to electrical load 511.

Modules 501, 503, 505, and 507, with external link bars 515 and 517, may thereby be a distribution block that provides distribution of fused power and ground connection to a plurality of electrical loads. The distribution block may do so with only a single connection to a power source and a single connection to ground.

Figure 6:
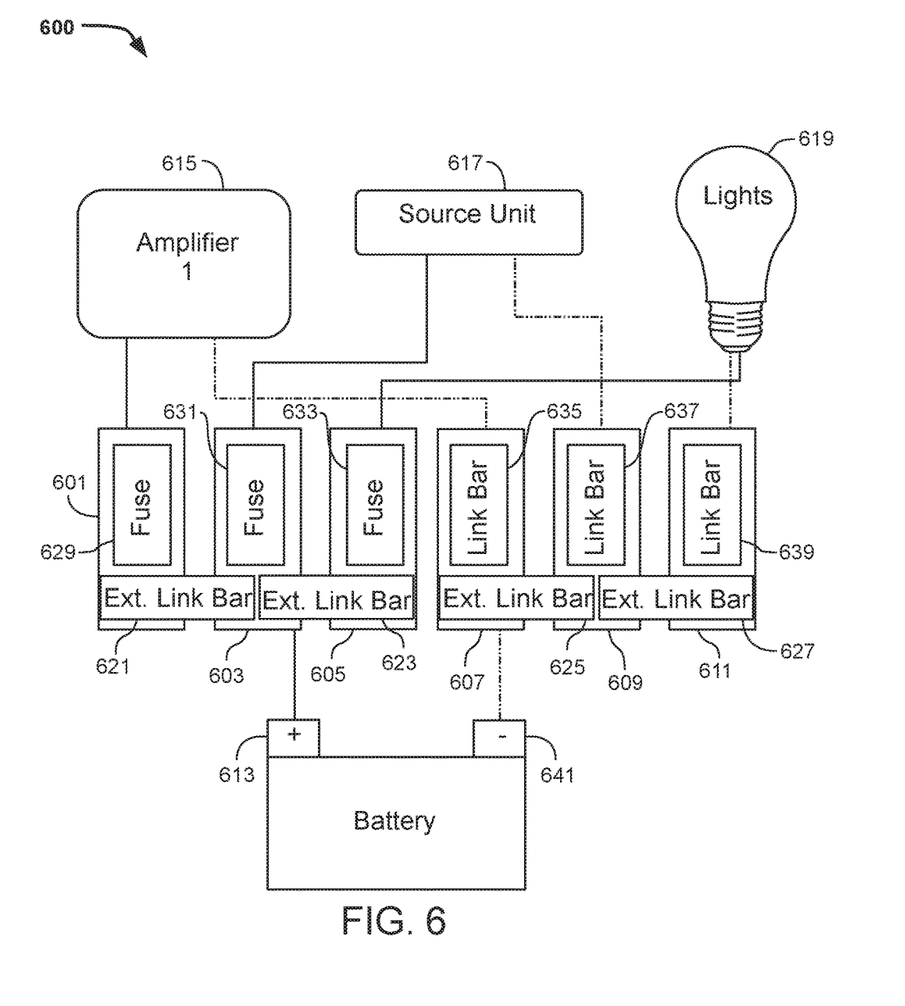
FIG. 6 shows yet another illustrative system in accordance with principles of the disclosure.

FIG. 6 shows illustrative system 600. System 600 may be an electrical system in a vehicle. System 600 may include modules 601, 603, 605, 607, 609, and 611. All or some of modules 601, 603, 605, 607, 609, and 611 may be interlocked. Modules 601, 603, 605, 607, 609, and 611 may be a distribution block. Module 601 may include fuse 629, module 603 may include fuse 631, and module 605 may include fuse 633. External link bar 621 may electrically connect a first block connector of module 601 and a first block connector of module 603. External link bar 623 may electrically connect the first block connector of module 603 and a first block connector of module 605. Module 607 may include link bar 635, module 609 may include link bar 637, and module 611 may include link bar 639. External link bar 625 may electrically connect a first block connector of module 607 and a first block connector of module 609. External link bar 627 may electrically connect the first block connector of module 609 and a first block connector of module 611.

Module 601 may be connected, via a second block connector, to the input of an electrical load 615. Electrical load 615 may be an amplifier. Module 603 may be connected, via a second block connector, to the input of an electrical load 617. Electrical load 513 may be a source unit. Module 605 may be connected, via a second block connector, to the input of an electrical load 619. Electrical load 619 may be a lighting system. In some embodiments, when characteristics of various electrical loads are different, each electrical load may require a different type of fuse. For example, fuse 629 in module 601 that is connected to an amplifier, may require a certain rating. In contrast, fuse 633 in module 605 that is connected to a lighting system, may require a different rating.

Module 607 may be connected, via a second block connector, to the output of electrical load 615. Module 609 may be connected, via a second block connector, to the output of electrical load 617. Module 611 may be connected, via a second block connector, to the output of electrical load 619.

Module 603 may be connected to a power source 613. Power source 613 may be the positive terminal of a battery. Electric current may flow from power source 613, through module 603 (via fuse 631), to electrical load 617. Module 603 may thereby provide fused power to electrical load 617. Electric current may also flow from power source 613, through external link bar 621, through module 601 (via fuse 629), to electrical load 615. Module 601 may thereby provide fused power to electrical load 615. Electric current may also flow from power source 613, through external link bar 623, through module 605 (via fuse 633), to electrical load 619. Module 605 may thereby provide fused power to electrical load 619.

Module 607 may be connected to a ground connection 641. Ground connection 641 may be the negative terminal of a battery. Electric current may flow from the output of electrical load 615, through module 607 (via link bar 635), to ground connection 641. Module 607 may thereby provide ground connection to electrical load 615. Electric current may also flow from the output of electrical load 617, through module 609 (via link bar 637), through external link bar 625, to ground connection 641. Module 609 may thereby provide ground connection to electrical load 617. Electric current may also flow from the output of electrical load 619, through module 611 (via link bar 639), through external link bar 627, further through external link bar 625, to ground connection 641. Module 611 may thereby provide ground connection to electrical load 619.

Modules 601, 603, 605, 607, 609, and 611, with external link bars 621, 623, 625, and 627, may thereby be a distribution block that provides distribution of fused power and ground connection to a plurality of electrical loads. The distribution block may do so with only a single connection to a power source and a single connection to ground.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements or steps.

Thus, apparatus for enabling distribution of electric power, fusing, and/or ground connection in electrical systems is provided. Persons skilled in the art will appreciate that the present invention can be practiced by other than the described embodiments, which are presented for purposes of illustration rather than of limitation, and that the present invention is limited only by the claims that follow.

What is claimed is:

1. A modular distribution block for mounting in a vehicle to provide fusing, power distribution, and/or ground distribution to electrical components in the vehicle, the distribution block comprising:

one or more modules, each module including:
a base defining a longitudinal axis, the base comprising:
two opposing ends and two opposing sides, wherein the two ends are disposed along the longitudinal axis, and the two sides are disposed orthogonally to the longitudinal axis;
a tongued protrusion along at least a portion of a length of one side, and a grooved protrusion along at least a portion of a length of the other side, the tongued protrusion of the module designed to interlock with the grooved protrusion of another one of the modules, and the grooved protrusion of the module designed to interlock with the tongued protrusion of another one of the modules; and a plurality of holes formed in the base, the holes for mounting the base to the vehicle using screws;

a first and a second electrically conductive block connector, the first block connector being mounted upon the base proximal to a first one of the opposing ends, and the second block connector being mounted upon the base proximal to a second one of the opposing ends, wherein:

each block connector is configured to be coupled to either a source of electrical power, a ground connection, or an electrical load, said electrical load being an electrical component of the vehicle, and said source of electrical power and around connection being a positive and a negative terminal of a vehicle battery respectively;

each block connector comprises an electrical terminal for coupling the block connector to the source of electrical power, the ground connection, or the electrical load, said electrical terminal including a cavity for accepting a wire therein, and the wire is secured in the cavity by way of a set screw; and each block connector is configured to be coupled to an end of either a fuse or a link bar, for extending the fuse or link bar across the base from the first block connector to the second block connector by coupling one end of the fuse or link bar to the first block connector and coupling another end of the fuse or link bar to the second block connector; and a cover, said cover connecting to the base and covering, at least partially, the first and second block connectors; and at least one external link bar, said external link bar for electrically connecting one of the block connectors of a first module and one of the block connectors of a second module by coupling one end of the external link bar to the one of the block connectors of the first module and another end of the external link bar to the one of the block connectors of the second module, said electrically connecting for distributing electric current between the first module and the second module over the external link bar;

wherein:

the one or more modules are configured to form a block of interlocked modules via each module interlocking the tongued protrusion of the module with the grooved protrusion of an adjacent module that is proximal to one side of the module, and interlocking the grooved protrusion of the module with the tongued protrusion of an adjacent module that is proximal to another side of the module; and each module is configured to mount to a vehicle, so that the block of interlocked modules are mounted adjacently in the vehicle.

2. The distribution block of claim 1, wherein each module further comprises at least a first and a second mounting component for each block connector, each mounting component configured to be coupled to either the link bar or the fuse, the first mounting component comprising a threaded cavity on a top surface of the block connector, and the second mounting component comprising a threaded cavity in an element protruding from a side of the block connector in the direction of the other block connector, each threaded cavity that enables the mounting of an end of the link bar or the fuse thereon with a screw, wherein the module thereby enables the mounting of one size of the link bar or the fuse across the base via the first mounting components, and a second size of the link bar or the fuse across the base via the second mounting components.

3. The distribution block of claim 1, wherein the cover of each module is further configured to be removable while the base is mounted to the vehicle, thereby enabling access to inner components of the module without dismounting the module from the vehicle.

4. A multiple-use platform for fusing, power distribution, and/or ground distribution, the platform comprising:

a base defining a longitudinal axis, the base comprising two opposing ends and two opposing sides, wherein the two ends are disposed along the longitudinal axis, and the two sides are disposed orthogonally to the longitudinal axis;

a first and a second electrically conductive block connector, each block connector including an electrical terminal and at least one mounting component, said electrical terminal configured to be coupled to either a source of electrical power, a ground connection, or an electrical load, and said mounting component configured to be coupled to either a link bar or a fuse, said link bar comprising a length of electrically conductive material for the distribution of electric current, and said fuse comprising a length of electrically conductive material that is designed to break an electric circuit of which it is part when the current therein exceeds a predetermined safe level, and wherein each block connector includes a plurality of mounting components, the mounting components configured to enable the mounting of fuses of multiple types and sizes across the platform; and a cover, said cover connecting to the base and covering, at least partially, the first and second block connectors;

wherein:

the first block connector is mounted upon the base proximal to a first one of the opposing ends, and the second block connector is mounted upon the base proximal to a second one of the opposing ends, both of the block connectors configured to enable the fuse or the link bar to extend from the first block connector to the second block connector by coupling a first end of the fuse or link bar to the mounting component of the first block connector and coupling a second end of the fuse or link bar to the mounting component of the second block connector, so as to enable the distribution of either fused power, power, or ground connection across the platform from the first block connector to the second block connector over the fuse or the link bar.

5. The platform of claim 4, wherein the electrical terminal of one of the block connectors is configured to be coupled to a wire that is connected to either the source of electrical power or ground, and the electrical terminal of the other block connector is configured to be coupled to a wire that is connected to the electrical load.

6. The platform of claim 5, wherein each electrical terminal includes a cavity to enable the coupling of the wire by accepting the wire therein, and the wire is secured in the cavity by way of a set screw.

7. The platform of claim 6, further comprising a plurality of adaptive inserts for the cavities, said plurality of adaptive inserts that enable the electrical terminals to accept wires ranging in thickness from 1/0-gauge to 8-gauge.

8. The platform of claim 4, wherein the base includes a tongued protrusion along at least a portion of a length of one side, and a grooved protrusion along at least a portion of a length of the other side, the tongued protrusion designed to interlock with the grooved protrusion of an adjacent platform, and the grooved protrusion designed to interlock with the tongued protrusion of another adjacent platform.

9. The platform of claim 8, further comprising at least one external link bar, wherein said external link bar enables an electrical connection between one of the block connector of the platform and one of the block connectors of the adjacent platform by coupling one end of the external link bar to the one of the block connectors of the platform and another end of the external link bar to the one of the block connectors of the adjacent platform.

10. The platform of claim 9, wherein the cover includes one or more apertures to allow for the external link bar to extend from the platform to the adjacent platform.

11. The platform of claim 9, wherein a first end of the external link bar is coupled to the first block connector of the platform, said first block connector whose electrical terminal is coupled to the power source, and a second end of the external link bar is coupled to the first block connector of the adjacent platform, thereby distributing power to both the platform and the adjacent platform.

12. The platform of claim 11, wherein the platform includes the fuse extending from the first block connector to the second block connector, and the electrical terminal of the second block connector of the platform is connected to the electrical load, and the adjacent platform also includes another fuse extending from the first block connector to the second block connector, and the electrical terminal of the second block connector of the adjacent platform is connected to another electrical load, thereby distributing fused power to the loads of both the platform and the adjacent platform.

13. The platform of claim 9, wherein a first end of the external link bar is coupled to the first block connector of the platform, said first block connector whose electrical terminal is coupled to the ground connection, and a second end of the external link bar is coupled to the first block connector of the adjacent platform, thereby distributing the ground connection to both the platform and the adjacent platform.

14. The platform of claim 13, wherein the platform includes the link bar extending from the first block connector to the second block connector, and the electrical terminal of the second block connector of the platform is connected to the electrical load, and the adjacent platform also includes another link bar extending from the first block connector to the second block connector, and the electrical terminal of the second block connector of the adjacent platform is connected to another electrical load, thereby distributing the ground connection to the loads of both the platform and the adjacent platform.

15. The platform of claim 4, wherein each block connector includes at least a first and a second mounting component, the first mounting component comprising a threaded cavity on a top surface of the block connector, and the second mounting component comprising a threaded cavity in an element protruding from a side of the block connector in the direction of the other block connector, each threaded cavity that enables the mounting of an end of the link bar or the fuse thereon with a screw, wherein the platform thereby enables the mounting of one size of the link bar or the fuse across the platform via the first mounting components, and a second size of the link bar or the fuse across the platform via the second mounting components.

16. The platform of claim 4, wherein the platform accepts MIDI, AFS, ANL, MANL, and blade type fuses.

17. A multiple-use platform for fusing, power distribution, and/or ground distribution, the platform comprising:
a base defining a longitudinal axis, the base comprising two opposing ends and two opposing sides, wherein the two ends are disposed along the longitudinal axis, and the two sides are disposed orthogonally to the longitudinal axis, wherein the base includes a tongued protrusion along at least a portion of a length of one side, and a grooved protrusion along at least a portion of a length of the other side, the tongued protrusion designed to interlock with the grooved protrusion of an adjacent platform, and the grooved protrusion designed to interlock with the tongued protrusion of another adjacent platform;
a first and a second electrically conductive block connector, each block connector including an electrical terminal and at least one mounting component, said electrical terminal configured to be coupled to either a source of electrical power, a ground connection, or an electrical load, and said mounting component configured to be coupled to either a link bar or a fuse, said link bar comprising a length of electrically conductive material for the distribution of electric current, and said fuse comprising a length of electrically conductive material that is designed to break an electric circuit of which it is part when the current therein exceeds a predetermined safe level;
at least one external link bar, wherein said external link bar enables an electrical connection between one of the block connectors of the platform and one of the block connector of the adjacent platform by coupling one end of the external link bar to the one of the block connectors of the platform and another end of the external link bar to the one of the block connectors of the adjacent platform; and
a cover, said cover connecting to the base and covering, at least partially, the first and second block connectors, wherein the cover includes one or more apertures to allow for the external link bar to extend from the platform to the adjacent platform;
wherein:
the first block connector is mounted upon the base proximal to a first one of the opposing ends, and the second block connector is mounted upon the base proximal to a second one of the opposing ends, both of the block connectors configured to enable the fuse or the link bar to extend from the first block connector to the second block connector by coupling a first end of the fuse or link bar to the mounting component of the first block connector and coupling a second end of the fuse or the link bar to the mounting component of the second block connector, so as to enable the distribution of either fused power, power, or ground connection across the platform from the first block connector to the second block connector over the fuse or the link bar.

* * * * *

UNITED STATES PATENT AND TRADEMARK OFFICE
CERTIFICATE OF CORRECTION

PATENT NO. : 10,381,184 B1  
APPLICATION NO. : 15/988111  
DATED : August 13, 2019  
INVENTOR(S) : Kevin Kuenzie, Brian Morelli and Jared Wilson Page 1 of 1

It is certified that error appears in the above-identified patent and that said Letters Patent is hereby corrected as shown below:

In the Claims

Column 15, Line 13 replace "around" with --ground--

Column 17, Line 5 replace "connector" with --connectors--

Signed and Sealed this  
First Day of September, 2020

Andrei Iancu  
*Director of the United States Patent and Trademark Office*